United States Patent
Caudill

(10) Patent No.: US 9,787,465 B1
(45) Date of Patent: Oct. 10, 2017

(54) SYSTEMS AND METHODS FOR TRIGGERLESS DATA ALIGNMENT

(71) Applicant: Spire Global, Inc., San Francisco, CA (US)

(72) Inventor: Harrison Caudill, San Francisco, CA (US)

(73) Assignee: SPIRE GLOBAL INC., San Francisco, CA (US)

( * ) Notice: Subject to any disclaimer, the term of this patent is extended or adjusted under 35 U.S.C. 154(b) by 0 days.

(21) Appl. No.: 15/187,983

(22) Filed: Jun. 21, 2016

(51) Int. Cl.
*H04L 7/02* (2006.01)
*H04L 1/00* (2006.01)

(52) U.S. Cl.
CPC .............. *H04L 7/02* (2013.01); *H04L 1/0009* (2013.01); *H04L 1/0045* (2013.01)

(58) Field of Classification Search
CPC ........ H04L 7/02; H04L 1/0045; H04L 1/0009
See application file for complete search history.

(56) References Cited

U.S. PATENT DOCUMENTS

| | | | |
|---|---|---|---|
| 4,566,100 A | | 1/1986 | Mizuno et al. |
| 4,835,517 A | * | 5/1989 | van der Gracht ...... H04B 1/707 375/222 |
| 5,287,115 A | | 2/1994 | Walker et al. |
| 5,937,016 A | | 8/1999 | Choi |
| 7,308,064 B2 | | 12/2007 | Kim et al. |
| 8,537,880 B2 | | 9/2013 | Agarwal et al. |
| 2009/0175538 A1 | * | 7/2009 | Bronstein ......... G06F 17/30799 382/173 |
| 2010/0111001 A1 | * | 5/2010 | Simmons .............. H04J 3/0608 370/329 |
| 2012/0011153 A1 | * | 1/2012 | Buchanan ............. G06F 21/552 707/771 |
| 2014/0133435 A1 | * | 5/2014 | Forenza ............... H04B 7/0626 370/329 |

(Continued)

OTHER PUBLICATIONS

"A Banded Smith-Waterman FPGA Accelerator for Mercury Blastp," Harris et.al., 2007 International Conference on Field Programmable Logic and Applications, Aug. 27-29, 2007, pp. 765-769, IEEE.

*Primary Examiner* — Dac Ha
(74) *Attorney, Agent, or Firm* — Troutman Sanders LLP; Mark Lehi Jones

(57) ABSTRACT

Certain implementations of the disclosed technology may include systems and methods for data alignment without requiring an external synchronizing trigger. A method is provided that can include receiving a signal that represents a plurality of frames, each of the plurality of the frames include an optional data portion and a predetermined portion. The method includes sampling and buffering at least a portion of the received signal to produce a buffered digital sequence. The method includes processing, by a sequence alignment module, the buffered digital sequence using a known sequence, where the known sequence corresponds to the predetermined portion. The method includes determining, using the sequence alignment module, respective positions of the buffered digital sequence corresponding to the known sequence, comparing the known sequence with the buffered digital sequence at the respective determined positions, and outputting one or more parameters based at least in part on the comparing.

22 Claims, 9 Drawing Sheets

(56) References Cited

U.S. PATENT DOCUMENTS

2015/0124856 A1* 5/2015 Youssef ............. H04B 1/70755
                                                 375/145
2015/0223250 A1* 8/2015 Negus ................... H04W 84/12
                                                 370/329

* cited by examiner

SYSTEMS AND METHODS FOR TRIGGERLESS DATA ALIGNMENT

FIELD

This disclosed technology relates to communications, and more particularly, to data alignment without requiring an external synchronizing trigger.

BACKGROUND

Bit error rate (BER) is often utilized in communication systems as a convenient figure-of-merit for characterizing the performance of a communications link under various conditions. For example, a digital communication system may have a target BER of $10^{-5}$ (i.e. no more than 1 in $10^5$ bits are received in error) but an actual BER measurement of $10^{-2}$ may indicate a need for troubleshooting or adjusting certain parameters of the system to achieve the target BER.

In high BER environments, synchronizing frames of test patterns (such as PN9) to measure the BER can be quite difficult because the synchronization systems can underperform. Classical BER calculation methods can require data to have consistent lengths. However, in circumstances where bit insertions and/or deletions are possible, these methods can fail to produce meaningful results. For example, if a single bit is inserted into the middle of an otherwise correct frame of 1024 bits, a simple bit comparison would yield ~512 bit errors.

Many factors can contribute to BER degradation in satellite communications, including atmospheric turbulence, low elevation angles, intermodulation noise, interference from other transmitters, etc. It can be important to measure the BER of a communication link under various operating conditions and parameters to troubleshoot and/or optimize a satellite communication link, particularly when transmit power is limited.

One challenge associated with measuring BER includes a comparison of transmitted data vs. received data, which can require knowledge of the transmitted data and alignment with the received data. Many digital signal processing research publications and conference presentations begin with the statement: "assume the system is synchronized." The issue is that systems do not necessarily start synchronized. A need exists for systems and methods that can be utilized to efficiently align portions of data streams.

BRIEF SUMMARY

Some or all of the above needs may be addressed by certain implementations of the disclosed technology. Certain implementations of the disclosed technology may include systems and methods for data alignment without requiring a trigger for synchronization.

According to an example implementation of the disclosed technology, a method is provided that can include receiving a signal that represents a plurality of frames, each of the plurality of the frames include an optional data portion and a predetermined portion. The method includes sampling and buffering at least a portion of the received signal to produce a buffered digital sequence. The method includes processing, by application of a sequence alignment module (e.g., a DNA/RNA/Amino-acid-based sequence alignment module such as a Smith-Waterman module, Needleman-Wunsch module, etc.), the buffered digital sequence using a known sequence, where the known sequence corresponds to the predetermined portion. The method includes determining, using the sequence alignment module, respective positions of the buffered digital sequence corresponding to the known sequence, comparing the known sequence with the buffered digital sequence at the respective determined positions, and outputting one or more parameters based at least in part on the comparing.

According to another example implementation, a system is provided. The system includes a receiver configured to: receive a transmitted signal, the transmitted signal comprising a representation of a plurality of frames, each of the plurality of the frames comprising an optional data portion and a predetermined portion; sample the received signal; and buffer at least a portion of the sampled signal to produce a buffered digital sequence. The system includes a sequence alignment module (e.g., a DNA/RNA/Amino-acid-based sequence alignment module such as a Smith-Waterman module, Needleman-Wunsch module, etc.) configured to: process the buffered digital sequence using a known sequence; determine respective positions of the buffered digital sequence corresponding to the known sequence; compare the known sequence with the buffered digital sequence at the respective determined positions; and output one or more parameters based at least in part on the comparing the known sequence with the buffered digital sequence at the respective determined positions.

Certain example implementations may be utilized to receive, from multiple independent receivers, respective multiple version of a transmitted signal. Certain example implementations may utilize multiple sequence alignment (MSA) on the multiple versions of the transmitted signal to correct, measure, and/or reconstitute corrupted or incomplete data. For example, in one implementation of the disclosed technology, a method is provided that includes receiving, by a plurality of receivers, a respective plurality of signals, the respective plurality of signals include a common originating signal and a respective plurality of noise components. The method can include determining, by each of the plurality of receivers, a bit-wise certainty of the respective plurality of signals. In one example implementation, the bit-wise certainty can be based on a ratio of bit energy to noise power density. Certain example implementations may include passing, to a multiple sequence alignment module, snippets of the plurality of signals having bit-wise certainty greater than a predetermined threshold. The method can include assembling, using the multiple sequence alignment module, the snippets to produce a version of the originating signal. In certain example implementations, the version of the originating signal may represent a plurality of frames, each of the plurality of the frames may have an optional data portion and a predetermined portion.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
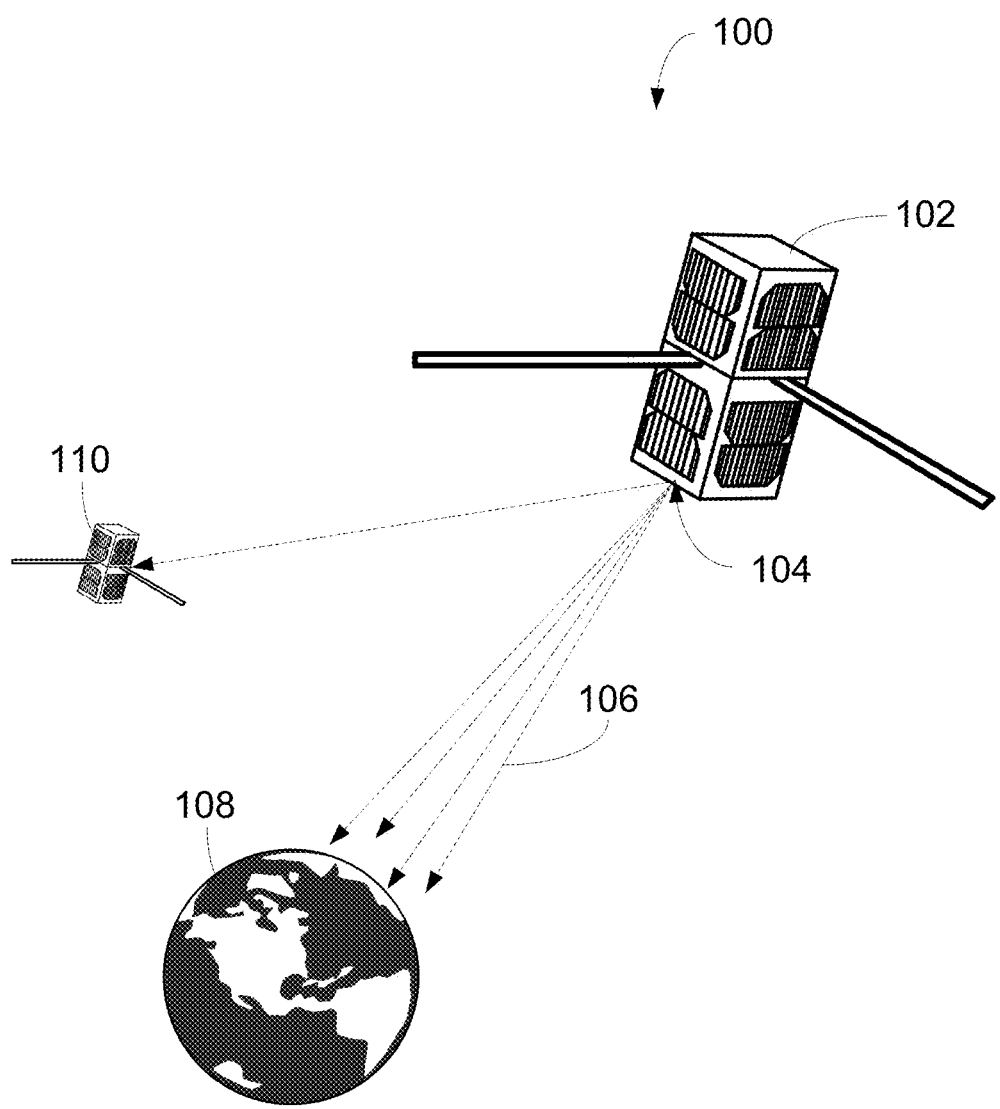
FIG. 1 depicts an example satellite communications system 100, according to an example implementation of the disclosed technology.

Some implementations of the disclosed technology will be described more fully hereinafter with reference to the accompanying drawings. This disclosed technology may however, be embodied in many different forms and should not be construed as limited to the implementations set forth herein.

Certain implementations of the disclosed technology may enable sequence alignment associated with transmitted and received data. Certain example implementations, may utilize the alignment techniques disclosed herein for a determination of bit error rate (BER) associated with satellite communications.

According to an example implementation of the disclosed technology, certain techniques may be utilized for alignment and/or synchronization of digital data that may have been subjected to noise in a wireless communication channel. Certain implementations of the disclosed technology may be utilized to solve data alignment, triggering, and/or synchronization challenges in certain communication systems by application of tools that have been developed for nucleotide analysis in the field of biology. For example, certain implementations of the disclosed technology utilize a modified process as traditionally used for genetic sequence alignment of DNA, RNA, amino-acid, and/or proteins.

In one example implementation, a modified Smith-Waterman process may be utilized herein for data alignment and to enable a BER measurement of transmitted vs. received data associated with a wireless communications link. (See Journal of Molecular Biology, Volume 147, Issue 1, 25 Mar. 1981, Pages 195-197, "Identification of common molecular subsequences," by T. F. Smith and M. S. Waterman). In the traditional application of nucleotide analysis, the Smith-Waterman process is used to determine similar regions between two nucleotide or amino-acid sequences, where the sequences are represented by strings made of base representations A (adenine), C (cytosine), G (guanine), T (thymine), U (uracil), etc. Two genetically related sequences may have low similarity (for example, due to mutations) and can be difficult to align. The Smith-Waterman process compares segments, identifies matches, mismatches, deletions, insertions, and optimizes the similarity measure, which may be utilized to yield local alignment of the two sequences.

In yet another example implementation, a modified banded Smith-Waterman process may be utilized herein for data alignment and to enable a BER measurement of transmitted vs. received data associated with a wireless communications link. (See B. Harris, A. C. Jacob, J. M. Lancaster, J. Buhler and R. D. Chamberlain, "A Banded Smith-Waterman FPGA accelerator for mercury BLASTP", Proc. Int. Conf. Field Programmable Logic Appl., pp. 765-769, 2007).

In another example implementation, a modified Needleman-Wunsch process may be utilized herein for data alignment and to enable a BER measurement of transmitted vs. received data associated with a wireless communications link. (See Needleman, Saul B. & Wunsch, Christian D., "A general method applicable to the search for similarities in the amino acid sequence of two proteins," Journal of Molecular Biology 48 (3): pp. 443-453, 1970).

Certain example implementations of the disclosed technology may utilize such above-referenced techniques and/or other similar variants and techniques as used in the field of biology, to address issues associated with data alignment issues in communication systems.

Some of the challenges associated with bit error rate (BER) measurements in satellite communication systems may be addressed and overcome by certain implementations of the disclosed technology. Certain traditional BER methods use sync-words and are effective only at low bit-error-rates. Furthermore, certain traditional BER methods do not address bit insertions and/or deletions. The disclosed technology provides a robust method for obtaining BER values from unsynchronized and/or high BER systems.

BER is a figure of merit for communication systems, and can be defined in the theoretical sense as a statistical probability that a given bit will not be decoded correctly. For example, it is the probability that a transmitted logic one will be incorrectly decoded as a logic zero, or vise versa. The BER is a decreasing function of the signal-to-noise ratio (S/N) of a communication system, and can be calculated as the number of flipped (received) bits divided by the number of transmitted bits. In practical terms, and according to an example implementation of the disclosed technology, to determine the number of flipped bits, a portion of received signal sequence is aligned with a corresponding known portion of the transmitted signal sequence and a bit-wise (i.e., bit-by-bit) comparison can be performed to determine the BER. In contrast, traditional systems typically utilize "triggers" to synchronize frames in a received sequence. The use of such triggers for synchronization in traditional systems can introduce unwanted complexities into the system, may require sample rate synchronization, and may be impossible, particularly in low S/N situations.

According to an example implementation of the disclosed technology, a module developed for biological nucleotide analysis may be utilized in digital communications to align received bit sequences with a known sequence to determine a BER without requiring an external trigger. Certain example implementations will now be discussed in detail with reference to FIGS. 1-8.

FIG. 1 depicts an example satellite communications system 100, for which the disclosed technology may be applied. The system 100 includes a satellite 102 having a radio transmitter 104 configured for transmitting a signal 106 to a remote receiver. In one example implementation, the remote receiver may be on earth 108. In certain example implementations, the satellite 102 may be configured to communicate with receivers installed on other spacecraft 110.

Figure 2:
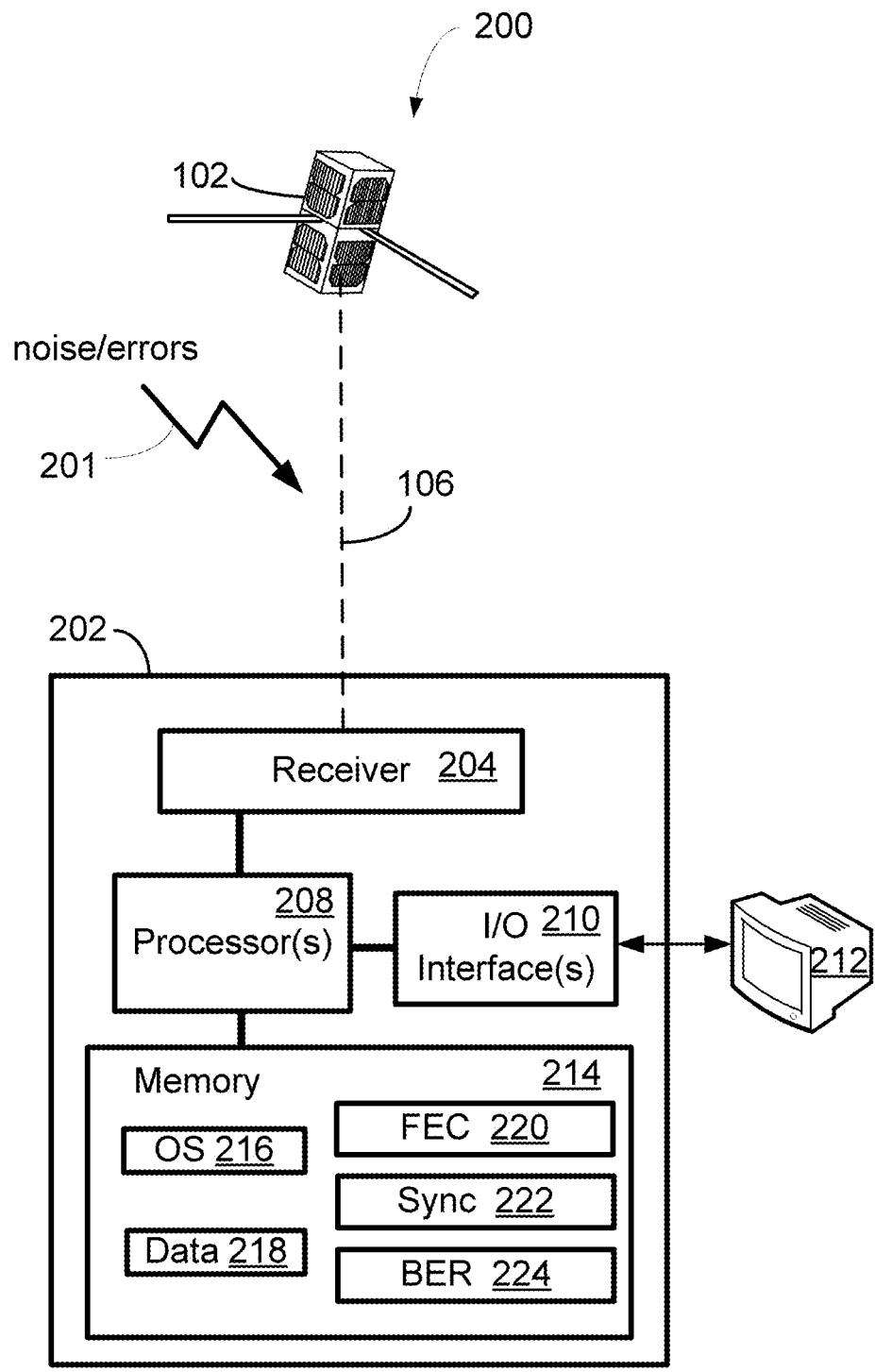
FIG. 2 depicts an example bit error rate system 200, according to an example implementation of the disclosed technology.

FIG. 2 depicts an example BER system 200, according to an example implementation of the disclosed technology. In certain example implementations, the system 200 includes a ground station that is configured to receive a transmitted signal 106 from a satellite 102 (such as the satellite 102 as shown in FIG. 1). In accordance with an example implementation of the disclosed technology, the transmitted signal 106 may be subjected to noise 201 that can degrade signal-to-noise ratio of the transmitted signal 106, resulting in errors such as flipped bits, dropouts, etc. The noise 201 can be introduced by a number of sources or factors such as atmospheric turbulence, low elevation angles, intermodulation noise, and interference from other transmitters, etc.

The ground station 202 can include a receiver 204 in communication with one or more processors 208. In an example implementation, the one or more processors 208 may be in communication with one or more input/out interfaces 210, for example, for output to one or more peripheral devices 212. The ground station 202 may also include a memory 214 in communication with the one or more processors 208.

In certain example implementations, the memory 214 associated with the ground station 202 (and/or a mission control center in communication with the ground station) may be configured to store an operating system 216 and data 218. In certain example implementations, the memory 214 can include and/or may be in communication with various modules that are configured to process the transmitted signal 106 that is received by the receiver 204. For example, in one implementation, the ground station 202 (and/or mission control center) may include a forward error correction (FEC) module 220. In an example implementation, the ground station 202 can include a synchronization and/or alignment (Sync) module 222. In an example implementation, the ground station 202 (and/or mission control center) can include a bit error rate (BER) module 224. In accordance with an example implementation of the disclosed technology, the various modules 220 222 224 may be in communication with one another and may operate cooperatively to produce an output BER measurement. In other example implementations, the various modules 220 222 224 may operate independently, as needed. In certain example implementations, the Sync module 222 may include and execute a Smith-Waterman module, for example to align the received signal, as disclosed herein.

Figure 3:
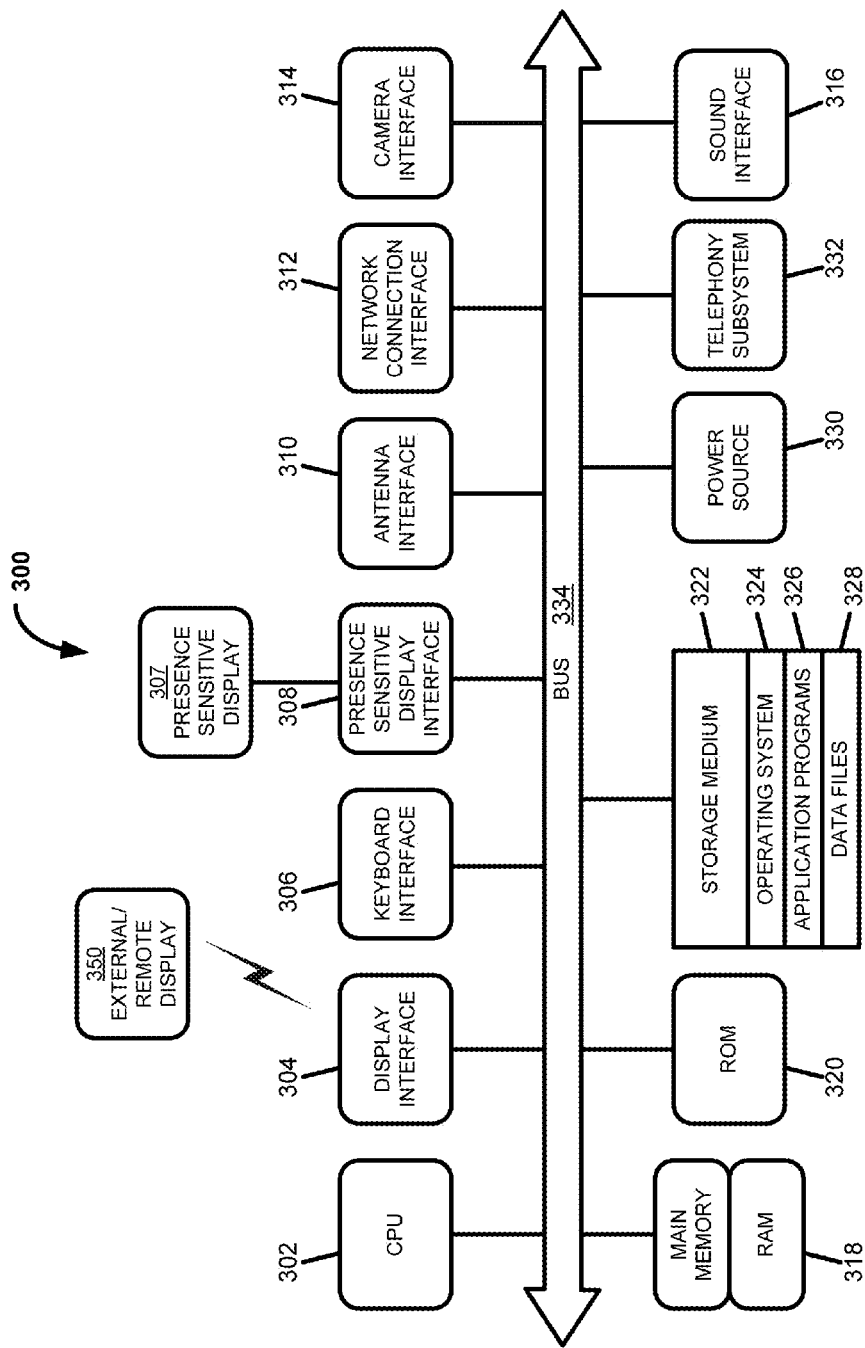
FIG. 3 depicts a block diagram of an illustrative computing device 300 according to an example implementation of the disclosed technology.

FIG. 3 depicts a block diagram of an illustrative computing device 300 according to an example implementation. Certain aspects of FIG. 3 may be embodied in a satellite and/or ground station (for example, the satellite 102 as shown in FIGS. 1 and 2 and/or the ground station 202 as shown in FIG. 2). According to one example implementation, the term "computing device," as used herein, may be a CPU, or conceptualized as a CPU (for example, the CPU 302 of FIG. 3). In this example implementation, the computing device (CPU) may be coupled, connected, and/or in communication with one or more peripheral devices, such as display. In certain implementation, the computing device 300 may be included in a terrestrial ground station (such as the ground station 202 as depicted in FIG. 2.) In another example implementation, the term computing device, as used herein, may refer to a processor and associated components, for example that may be installed in a satellite.

In an example implementation, the computing device may output content to its local display and may transmit and receive messages via the antenna interface 310, the network connection interface 312, telephony subsystem 332, etc. In example implementation, the computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing unit (CPU) 302, where computer instructions are processed. Certain example implementations can include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (for example, data, images, and other information as previously discussed) for an external/remote display that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

In an example implementation, the network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 300 may include a keyboard interface 306 that provides a communication interface to a keyboard. In one example implementation, the computing device 300 may include a pointing device interface 308 for connecting to a presence-sensitive input interface. According to certain example implementations of the disclosed technology, the pointing device interface 308 may provide a communication interface to various devices such as a touch screen, a depth camera, etc.

The computing device 300 may be configured to use an input device via one or more of input/output interfaces (for example, the keyboard interface 306, the display interface 304, the pointing device interface 308, the antenna interface 310, the network connection interface 312, camera interface 314, sound interface 316, etc.,) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Certain example implementations of the computing device 300 may include an antenna interface 310 in communication with an antenna. Certain example implementations of the antenna interface 310 can include one or more of: a receiver, analog-to-digital converter, sampler, buffers, memory, and memory. Certain example implementations can include a network connection interface 312 that provides a communication interface to a network. In certain implementations, a camera interface 314 may act as a communication interface to provide functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and content files 328 are stored. In accordance with certain example implementations of the disclosed technology, the application programs 326 can include one or more of programs to: align received data streams, synchronize the received data streams, decode the forward error correction; and determine BER.

According to an example implementation, the computing device 300 includes a power source 330 that provides an appropriate alternating current (AC) or direct current (DC) to power components. According to an example implementation, the computing device 300 can include a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing unit (CPU), controller or processor, or may be conceptualized as a CPU, controller or processor (for example, the CPU processor 302 of FIG. 3). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, satellite processor, or some other like terminology. In an example embodiment, the computing device may output content to its local display or speaker(s). In another example implementation, the computing device may output content to an external display device (e.g., over Wi-Fi) such as a TV or an external computing system.

Figure 4:
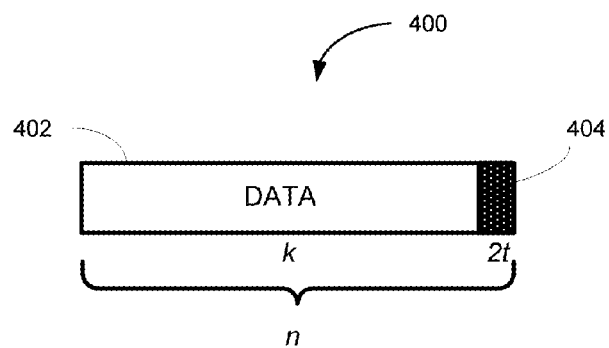
FIG. 4 depicts an example frame 400 of digital data, according to an example implementation of the disclosed technology.

According to an example implementation of the disclosed technology, various forms of forward error correction (FEC) may be employed with the disclosed systems. For example, FEC may be use to transmitted data encoded with redundant information, which allows the receiver to detect a limited number of errors that may occur anywhere in the message, and to correct these errors without retransmission. FEC gives the receiver the ability to correct errors without needing a reverse channel to request retransmission of data, but at the cost of a fixed, higher forward channel bandwidth. FEC is therefore applied in situations where retransmissions are costly or impossible, such as one-way communication links FIG. 4 depicts an example block 400 of digital data, for example, that may be part of a data stream transmitted from a satellite (such as via the transmitted signal 106 as shown in FIGS. 1 and 2). In an example implementation, a Reed-Solomon encoder may be utilized to encode the original data, for example to add extra "redundant" bits. In this example implementation, errors that occur during transmission may be processed by a corresponding decoder to correct errors and recover the original data. A typical Reed-Solomon code is specified as RS(n,k) with s-bit symbols, meaning that the encoder takes k data symbols 402 of s bits each and adds parity symbols 404 to make an n symbol codeword having n-k parity symbols of s bits each. A Reed-Solomon decoder can correct up to t symbols that contain errors in a codeword, where $2t=n-k$. However, this assumes that the system is synchronized, and/or that n symbols of the block 400 can be aligned/synchronized/triggered and extracted from the transmitted signal.

As known to those having skill in the art, the number and type of errors that can be corrected depends on the characteristics of the encoding. The examples provided here are for illustration purposes and are not intended to limit the scope of the disclosed technology to a particular encoder or decoder.

Figure 5:
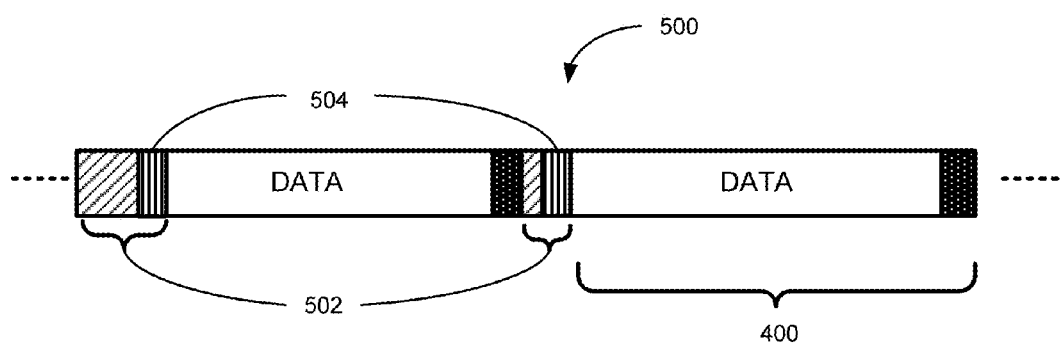
FIG. 5 depicts an example data stream 500 that may be transmitted and received at a ground station, according to an example implementation of the disclosed technology.

FIG. 5 depicts an example data stream 500 that may be transmitted (for example, from a satellite 102 as depicted in FIG. 2) and received at a ground station (such as the ground station 202 in FIG. 2). In certain example implementations, the data stream 500 can include packet headers and associated payload. For example, the payloads may include blocks 400 of digital data, as described above with respect to FIG. 4. In an example implementation, the blocks 400 can be separated by headers that can include idle frames 502. According to an example implementation of the disclosed technology, the idle frames 502 can include a repeating portion of data, such as predetermined portion 504 that can be utilized to demark the data portion of the payload data block 400. For example, the predetermined portion 504 may demark the beginning of the data portion of the payload data block 400. In one example implementation, the predetermined portion 504 can be a whitened idle frame. For example, a whitened idle frame can be represented by 0XAAAAAA . . . which is a known bit pattern. As described herein, the term "predetermined portion" may include a predetermined sync word, whitened idle frame, and/or any predetermined data sequence.

In certain example implementations, the same predetermined portion 504 can be included in each idle frame 502. In accordance with an example implementation of the disclosed technology, the predetermined portion 504 can be "known" by the receiver such that the receiver can utilize the predetermined portion 504, for example, to perform synchronization and BER measurements.

Figure 6:
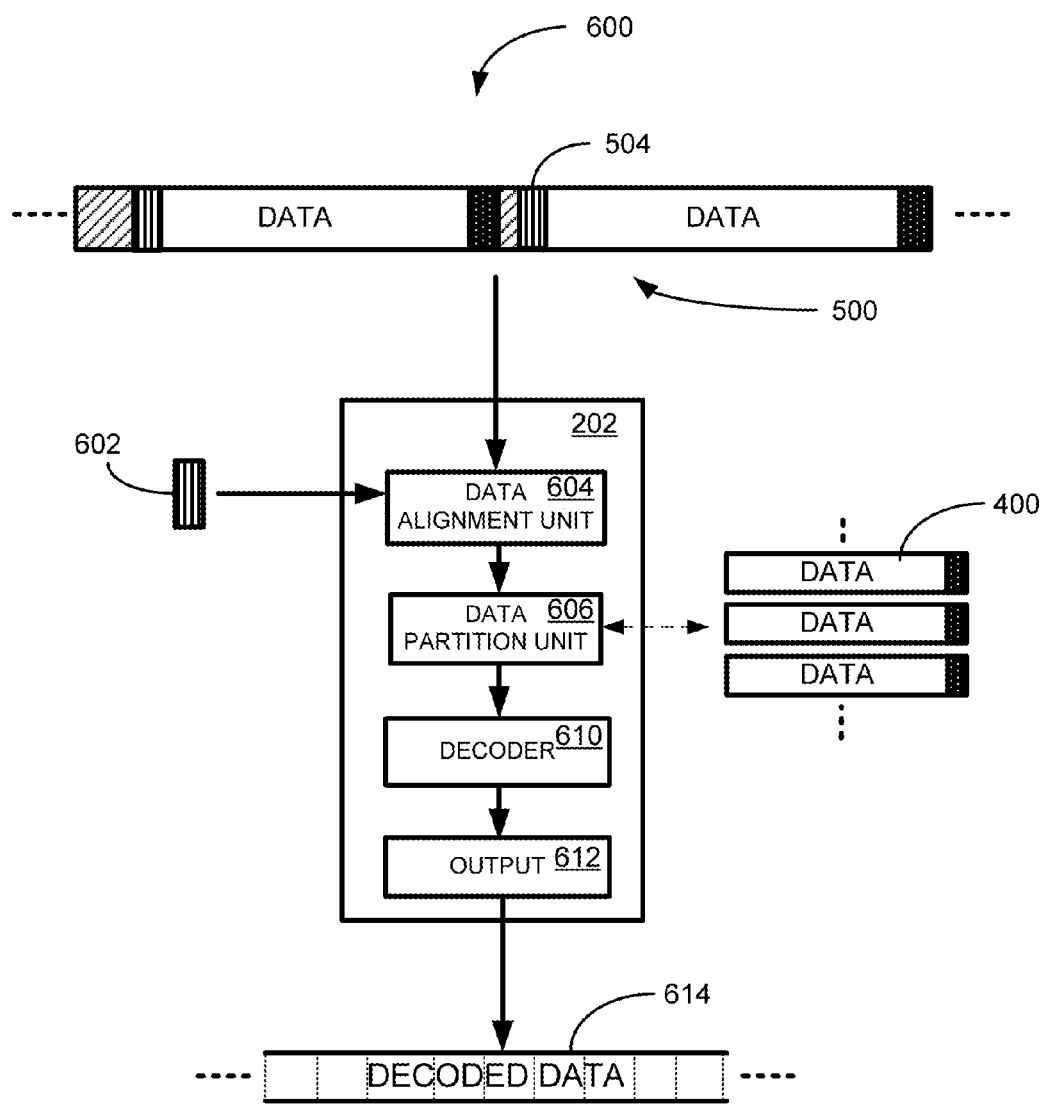
FIG. 6 depicts and example process 600 for aligning and extracting data, according to an example implementation of the disclosed technology.

FIG. 6 depicts and example process 600 that builds on the information described above with respect to FIG. 4 and FIG. 5. According to an example implementation of the disclosed technology, a data stream 500 may be received at a ground station 202. In an example implementation, a known sequence 602 may be utilized (for example, in the data alignment unit 604) to process the input data stream 500. In accordance with an example implementation of the disclosed technology, the data alignment unit 604 may implement a version of a DNA/RNA/Amino-acid-based sequence alignment module, such as a Smith-Waterman module, Needleman-Wunsch module, etc.). For illustration purposes, the Smith-Waterman process be discussed in the example below to detect a corresponding transmitted predetermined portion 504 in the input data stream 500. However, it should be understood that other variants of sequence alignment processes, algorithms, and/or modules (that have traditionally been used for biological/genetic sequencing and/or alignment) may be utilized without departing from the scope of the disclosed technology.

As will be discussed below with reference to FIG. 7, the input data stream 500 may have been subjected to various noise degradations, thus the transmitted predetermined portion 504 may have experienced flipped bits and other problems. However, in accordance with certain implementations of the disclosed technology, the application of the Smith-Waterman module may be able to recover the alignment of the transmitted predetermined portion 504 such that it can be compared to the known sequence 602 for determination of a BER.

With continued reference to FIG. 6, and according to an example implementation of the disclosed technology, once the sequence alignment is processed by data alignment unit 604, the data partition unit 606 may extract the corresponding data blocks 400. According to an example implementation, the data blocks 400 may then be processed by a decoder 610 and output to provide a stream of decoded data 614.

In an example implementation, the decoder 610 may implement a Reed-Solomon decode process. A number of commercial hardware implementations exist for the decoding process. For example, integrated circuits (ICs) are available that support a certain amount of programmability (for example, RS(255,k) where $t=1$ to 16 symbols). In certain example implementations, VHDL or Verilog designs may be implemented, which can have a number of advantages over standard ICs. For example, a logic core can be integrated with other VHDL or Verilog components and synthesized to an FPGA (Field Programmable Gate Array) or ASIC (Application Specific Integrated Circuit) to enable so-called "System on Chip" designs where multiple modules can be combined in a single IC. Depending on production volumes, logic cores can often give significantly lower system costs than standard ICs and may provide a certain amount of flexibility. Certain example implementations may utilize software implementations of the Reed-Solomon decode process, but such solutions will not be discussed here in the interest of brevity.

Figure 7:
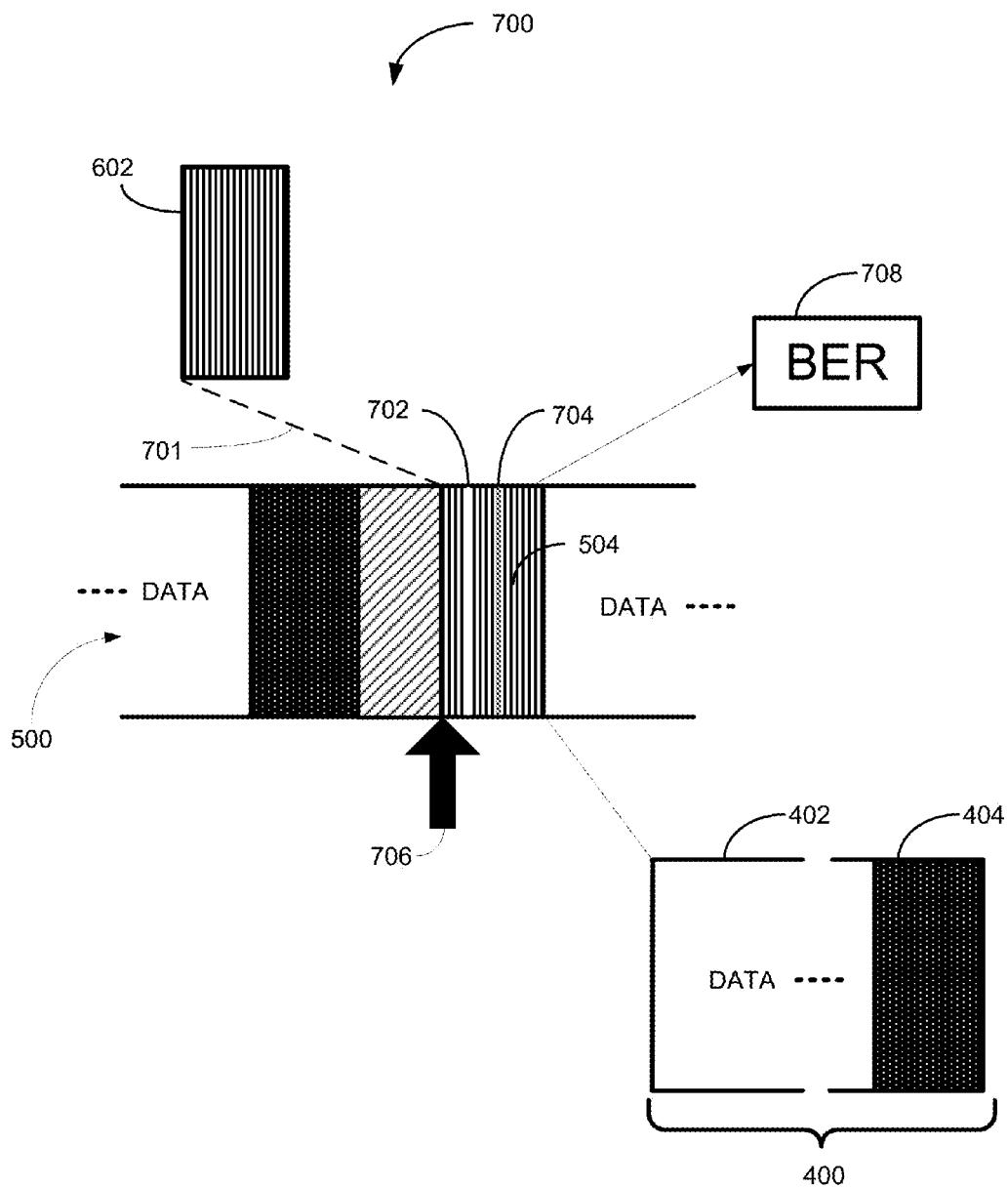
FIG. 7 is an example illustration 700 of aligning a frame based on a known sequence, according to an example implementation of the disclosed technology.

FIG. 7 is an example illustration 700 of how a sequence alignment module (for example, a Smith-Waterman module) may be utilized to align 701 a known sequence 602 with a transmitted predetermined portion 504 of a transmitted data stream 500, even if the transmitted predetermined portion 504 has dropouts 702 and/or flipped bits 704, according to an example implementation of the disclosed technology. As will be discussed below with respect to TABLES 1-4 below, the sequence alignment module may be utilized to determine the beginning position 706 of the transmitted predetermined portion 504. In accordance with an example implementation of the disclosed technology, once this beginning position 706 is established, the known sequence 602 may be compared with the transmitted predetermined portion 504 to determine an approximate BER 708. In addition, and according to an example implementation of the disclosed technology, once the beginning position 706 of the transmitted predetermined portion 504 is known, the data block 400 with associated data 402 and parity 404 may be extracted for further processing, as discussed above with reference to FIG. 6.

As referenced above, the sequence alignment module may be utilized to determine the position 706 of the transmitted predetermined portion(s) 504 in the data stream 500, which may provide alignment of the known sequence 602 with the transmitted predetermined portion 504 without requiring an external trigger. Certain example implementations of the sequency alignment module, as utilized herein, will now be described below with reference to TABLES 1-4, which depict an example population of an alignment matrix. In general, the sequence alignment module may be utilized to find sub-regions in a first string that align well with sub-regions of a second string. Any cell in the alignment matrix may be utilized to indicate the end of a local alignment, and similarity measure vs. position may be represented by a value in each cell of the matrix.

As an example, TABLE 1 shows a first string {1010} in the first column of the matrix. This first string, for example, could represent a known sequence (such as the known sequence 602 of FIG. 7). A second string {11010010} is listed in the first row of the matrix. This second string, for example, may represent data that is transmitted by a satellite, degraded with noise, and received by a ground station. In this example, the match/mismatch/gap parameters can be set as follows: 1 for a match, −3 for a mismatch and −4 for a gap. According to an example implementation of the disclosed technology, the first row and column may be populated with a 1 (for a corresponding match) or a 0 (for a mismatch) between the corresponding row and column entries of the first string and the second string.

TABLE 1

|   | 1 | 1 | 0 | 1 | 0 | 0 | 1 | 0 |
|---|---|---|---|---|---|---|---|---|
| 1 | 1 | 1 | 0 | 1 | 0 | 0 | 1 | 0 |
| 0 | 0 |   |   |   |   |   |   |   |
| 1 | 1 |   |   |   |   |   |   |   |
| 0 | 0 |   |   |   |   |   |   |   |

TABLE 2 depicts an example next step in the sequence alignment module process in which diagonal matches take the value of 1, plus the value of the previous cell in the diagonal. If there is no match, then the value entered is the highest value determined from three different calculations or 0 if the highest value turns out to be negative. In the first calculation, (as shown in the cell at row 3, column 3 of TABLE 2) a cell takes on the value of −3 plus the value from the previous cell in the diagonal which should be −3 (a mismatch)+1 (previous cell in the diagonal)=−2. For the second and third calculations for this cell, a deletion applies a greater score than the first calculated score (−2). This is done by taking the value of −4 (value for a gap) and adding the value in the previous row or in the previous column (−4+0=−4 in the previous column, or −4+1=−3 in the previous row). Since all three values are negative, the score in the cell is designated as a 0.

TABLE 2

|   | 1 | 1 | 0 | 1 | 0 | 0 | 1 | 0 |
|---|---|---|---|---|---|---|---|---|
| 1 | 1 | 1 | 0 | 1 | 0 | 0 | 1 | 0 |
| 0 | 0 | 0 |   |   |   |   |   |   |
| 1 | 1 |   |   |   |   |   |   |   |
| 0 | 0 |   |   |   |   |   |   |   |

TABLE 3 depicts the completed alignment matrix in which all remaining cells have been populated according the three calculations, as provided in the above in the example with respect to TABLE 2. For example, the match/mismatch/gap parameters were set to 1 for a match, −3 for a mismatch, and −4 for a gap.

TABLE 3

|   | 1 | 1 | 0 | 1 | 0 | 0 | 1 | 0 |
|---|---|---|---|---|---|---|---|---|
| 1 | 1 | 1 | 0 | 1 | 0 | 0 | 1 | 0 |
| 0 | 0 | 0 | 2 | 0 | 2 | 1 | 0 | 2 |
| 1 | 1 | 1 | 0 | 3 | 0 | 0 | 2 | 0 |
| 0 | 0 | 0 | 2 | 0 | 4 | 1 | 0 | 3 |

The next process, according to an example implementation, is to find the cell with the greatest value. In this example, this cell is designated by the cell at row 5, column 5 in TABLE 3, and the cell has a value of 4. This cell represents the end of the best alignment of the two strings.

To complete the match, the diagonal is followed backwards along the path with the highest score. The resulting matching positions may be represented as:

| 1 | 1 | 0 | 1 | 0 | 0 | 1 | 0 | (the second string - i.e., a portion of the received data) |
|---|---|---|---|---|---|---|---|---|
| — | \| | \| | \| | \| | — | — | — | (vertical lines indicate a match) |
| — | 1 | 0 | 1 | 0 | — | — | — | (the first string - i.e, the known sequence) |

As is illustrated above in this example, the application of a revised version of the sequence alignment module (to apply to digital ones and zeros, rather than to nucleotide bases) allows finding the best alignment of a known sequence with received data. In certain example implementations, the match/mismatch/gap parameters may be adjusted accordingly, for example, to adjust the alignment optimization with different gap or mismatch penalties.

TABLE 4 depicts another example of a fully completed alignment matrix in which the second string (i.e., transmitted by the satellite, subjected to noise, and received) has experienced "flipped bits" at the $2^{nd}$, $5^{th}$, and $8^{th}$ positions. In this example (and using the same match/mismatch/gap parameters as above), the cell having the greatest value is designated by the cell a row 4, column 8 in TABLE 4, and the cell has a value of 3. This cell represents the end of the best alignment of the two strings.

TABLE 4

|   | 1 | 0 | 0 | 1 | 1 | 0 | 1 | 1 |
|---|---|---|---|---|---|---|---|---|
| 1 | 1 | 0 | 0 | 1 | 1 | 0 | 1 | 1 |
| 0 | 0 | 2 | 1 | 0 | 0 | 2 | 0 | 0 |
| 1 | 1 | 0 | 0 | 2 | 1 | 0 | 3 | 1 |
| 0 | 0 | 2 | 1 | 0 | 0 | 2 | 0 | 0 |

The resulting matching positions may be represented as:

| 1 | 0 | 0 | 1 | 1 | 0 | 1 | 1 | (the second string - i.e., a portion of the received data) |
|---|---|---|---|---|---|---|---|---|
| — | — | — | — | \| | \| | \| | x | (the x represents possible noise in the transmitted predetermined portion) |
| — | — | — | — | 1 | 0 | 1 | 0 | (the first string - i.e, the known sequence) |

As may be appreciated, various adjustments may be made to the known sequence length and/or the match/mismatch/gap parameters as needed.

Returning now to FIG. 7 in light of the examples shown above with reference to TABLE 3 and TABLE 4, once the known sequence 602 is locally aligned with the best match position of the transmitted predetermined portion 504 (which may or may not have flipped bits), a bit-wise comparison may be performed to determine a BER 708.

In certain example implementations, once the system is synchronized using a sequence alignment module (such as a Smith-Waterman or variant), the search-space may be reduced for subsequent rounds of data streams and associated data frames. In addition, and according to an example implementation of the disclosed technology, if the system does not generate insertions or deletions, further synchronization may not be needed. Thus in certain example implementations, the alignment module may be utilized initially and/or intermittently for synchronization.

Figure 8:
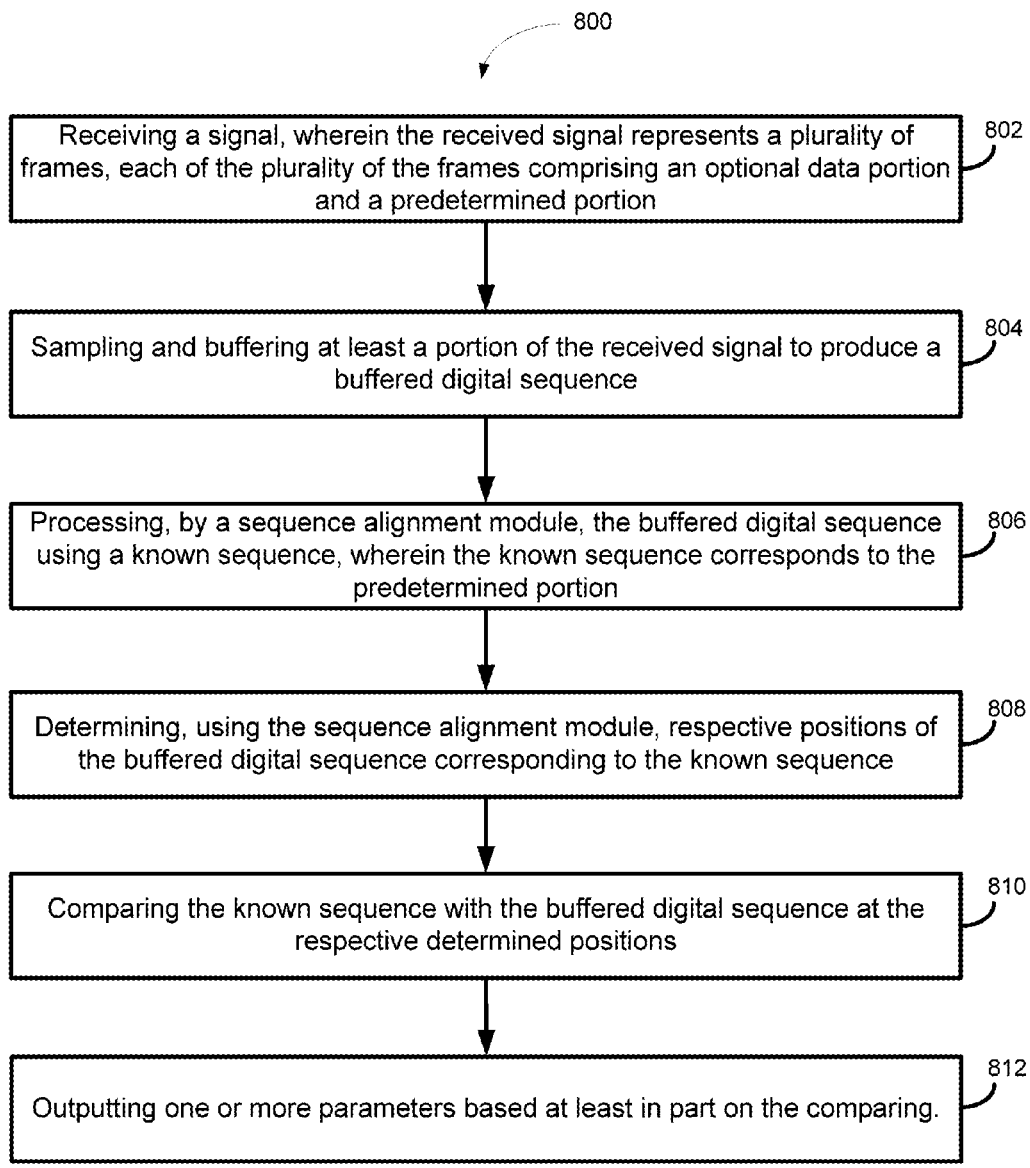
FIG. 8 is a flow diagram of a method 800 according to an example implementation of the disclosed technology.

FIG. 8 is flow diagram of a method 800, according to an example implementation of the disclosed technology. In block 802, the method 800 includes receiving a signal, wherein the received signal represents a plurality of frames, each of the plurality of the frames comprising an optional data portion and a predetermined portion. In block 804, the method 800 includes sampling and buffering at least a portion of the received signal to produce a buffered digital sequence. In block 806, the method 800 includes processing, by a sequence alignment module, the buffered digital sequence using a known sequence, wherein the known sequence corresponds to the predetermined portion. In block 808, the method 800 includes determining, using the sequence alignment module, respective positions of the buffered digital sequence corresponding to the known sequence. In block 810, the method 800 includes comparing the known sequence with the buffered digital sequence at the respective determined positions. In block 812, the method 800 includes outputting one or more parameters based at least in part on the comparing.

In certain example implementations, the sequence alignment module may implement a Smith-Waterman process or algorithm, or variant thereof. In another example implementation, the sequence alignment module may implement a Needleman-Wunsch process or algorithm, or variant thereof.

In certain example implementations, the one or more parameters can include a bit error rate (BER). In certain example implementations, the BER is further based on a summation of mismatched bits divided by a total number of compared bits.

In certain example implementations, the one or more parameters may be utilized in connection with a vector signal analyzer, for example, for providing a synchronization without requiring an external trigger to indicate the beginning of a frame.

In certain example implementations, the received signal may be transmitted by the satellite.

In certain example implementations, the received signal is degraded by noise such that the predetermined portion of the signal initially matches the known sequence, but the noise operates to introduce errors in the signal.

In certain example implementations, determining the respective positions includes scoring an alignment of the digital sequence with the known sequence based on predetermined parameters. In an example implementation, scoring the alignment based on the predetermined parameters can include increasing a score for each adjacent matching bit and decreasing a score for each mismatching bit. In certain example implementations, insertions and deletions are treated as mismatches. In certain example implementations, insertions and/or deletions may be scored according to modified parameters.

In certain example implementations, the comparing can include a bit-wise comparison of the known sequence with the buffered digital sequence at the respective determined positions.

Certain example implementations may include extracting data portions of the buffered digital sequence based on the determined respective positions.

Certain example implementations may include decoding the extracted data portions.

Certain example implementation of the disclosed technology can provide technical benefits that can include improvements over traditional systems. For example, the disclosed technology may enable synchronizing a receiver with an incoming data stream without a trigger. Certain example implementations may provide the technical benefit of measuring bit error rate (BER) by data present in an idle frame. Certain example implementations may provide the technical benefit of measuring bit error rate (BER) by comparison of a known sequence with information received in a transmitted predetermined portion of a received signal.

Figure 9:
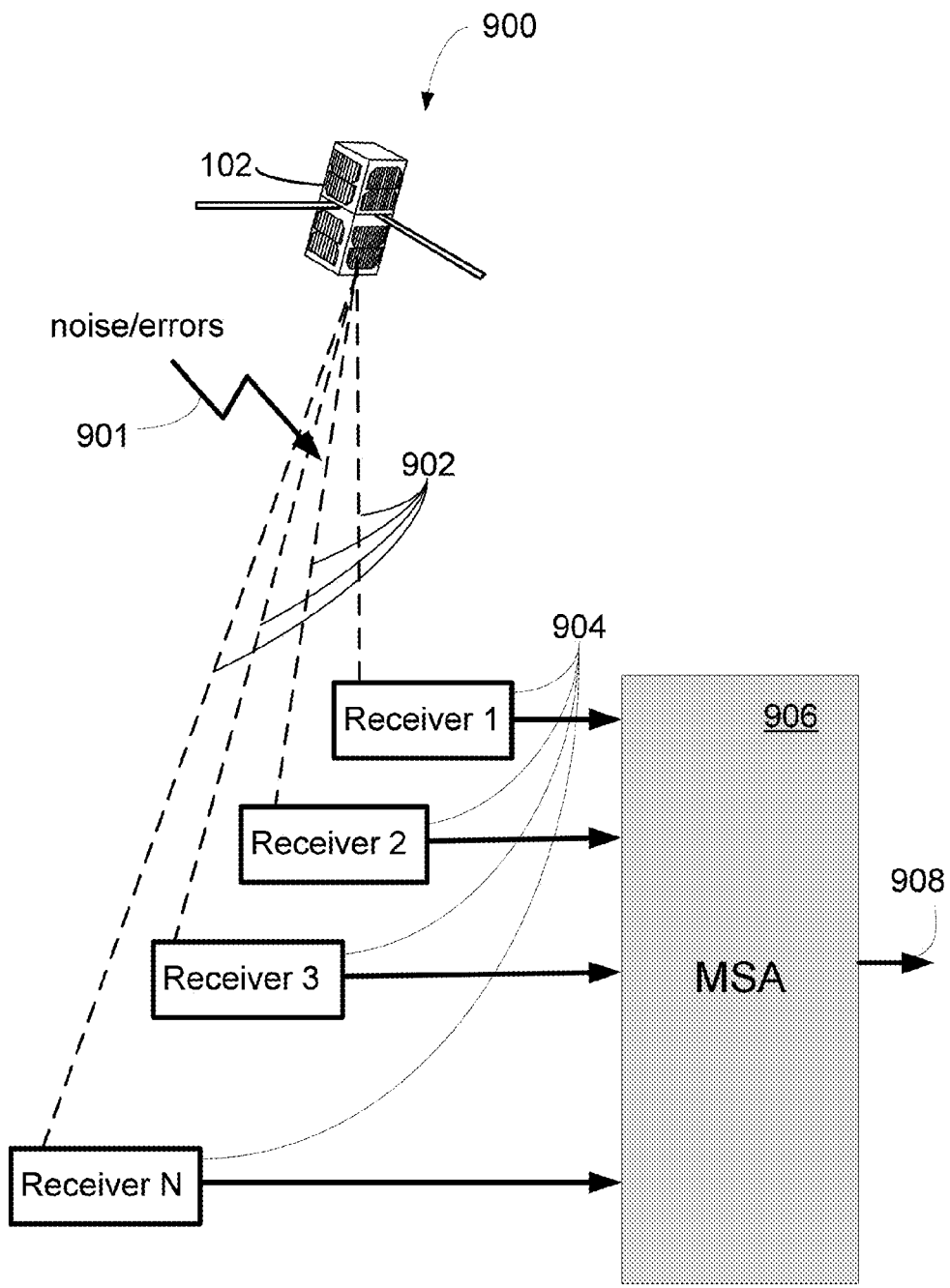
FIG. 9 depicts an example system 900 in which multiple sequence alignment is utilized, according to an example implementation of the disclosed technology.

FIG. 9 depicts an example system 900 that can utilize multiple sequence alignment to assemble multiple versions of a signal. (See "Multiple alignment for structural functional or phylogenetic analyses of homologous sequences," by Duret, L. and S. Abdeddaim in "Bioinformatics sequence structure and databanks." D. Higgins and W. Taylor, Oxford University Press, 2000).

According to an illustrative implementation of the disclosed technology, a satellite 102 may transmit a signal 902 that can be received by a plurality of receivers 904. For example, each of the plurality of receivers 904 may be associated with a different ground station, each positioned at a different location. In one example implementation, the transmitted signal 902 may be subjected to various noise/errors 901 that can vary as a function of the respective signal path(s) from the satellite 102 to the particular receiver 904. The noise 901 can be introduced by a number of sources or factors such as atmospheric turbulence, low elevation angles, intermodulation noise, and interference from other transmitters, etc., and may be different for each path the signals 902 traverse. Thus, each receiver 904 may receive a different, similar, or same version of the transmitted signal 902 depending on a number of factors. In an example implementation, these transmitted signal 902 versions may be fed into a multiple sequence alignment (MSA) module 906, which may produce an output 908 that can be improved version of the individual inputs. In certain example implementations, the output 908 of the MSA module 906 may be derived from a consensus of the inputs provided from each receiver 904.

According to an example implementation of the disclosed technology, the MSA module 906 may process the input signals using a multiple sequence alignment process. In an example implementation, the input sequences received from each of the receivers 904 can be aligned and consensus values for each bit within each frame may be utilized to process the output 908. For example, by aligning the various received sequences with a preamble or header and/or interspersed sync bytes, a consensus bit for the received bits may be determined for each bit and each frame of the sequence. As necessary, a query sequence may be utilized and adjusted to the consensus value of the received frame, which may provide improved alignment for decoding subsequent frames.

In accordance with an example implementation of the disclosed technology, one or more of the receivers 904 may be configured to only send bits to the MSA module 906 when the bits are determined to have a high certainty of being as-transmitted by the satellite 102. In one example implementation, a ratio of bit energy (Eb) to noise power density (NO) of the received signal may be determined by the receiver 904. In an example implementation, if Eb/NO drops below a given value (predictive of bit errors), the receiver 904 may be configured to suppress its output for such bits. This process may result in a series of short reads (snippets). In accordance with an example implementation of the disclosed technology, the snippets may then be combined using standard sequence assembly techniques (for example, by the MSA module 906) to reconstitute the original message.

In accordance with an example implementation of the disclosed technology, the MSA module 906 may implement a sequence assembly, similar to a process utilized in bioinformatics, to align and merge fragments (snippets) of the original signal 902. (See Myers et al. "A whole-genome assembly of *Drosophila*," Science 287 (5461): 2196-204, March 2000). The problem of sequence assembly can be described using the analogy of taking many copies of a page of text, passing each page through a shredder, and re-assembling the text back together using the shredded pieces. In such a process, the re-assembled text may have repeated words, sentences, paragraphs, etc., and even some words may have some typographical errors due to the shredding, which may make the text completely unrecognizable. Certain example implementations of the technology may utilize sequence assembly and redundancy consensus of the multiple versions of the signal 902 received at the multiple receivers 904 to produce an improved output.

In certain example implementations, the output 908 of the MSA module may be further processed, as described with reference to FIGS. 2-7.

Figure 10:
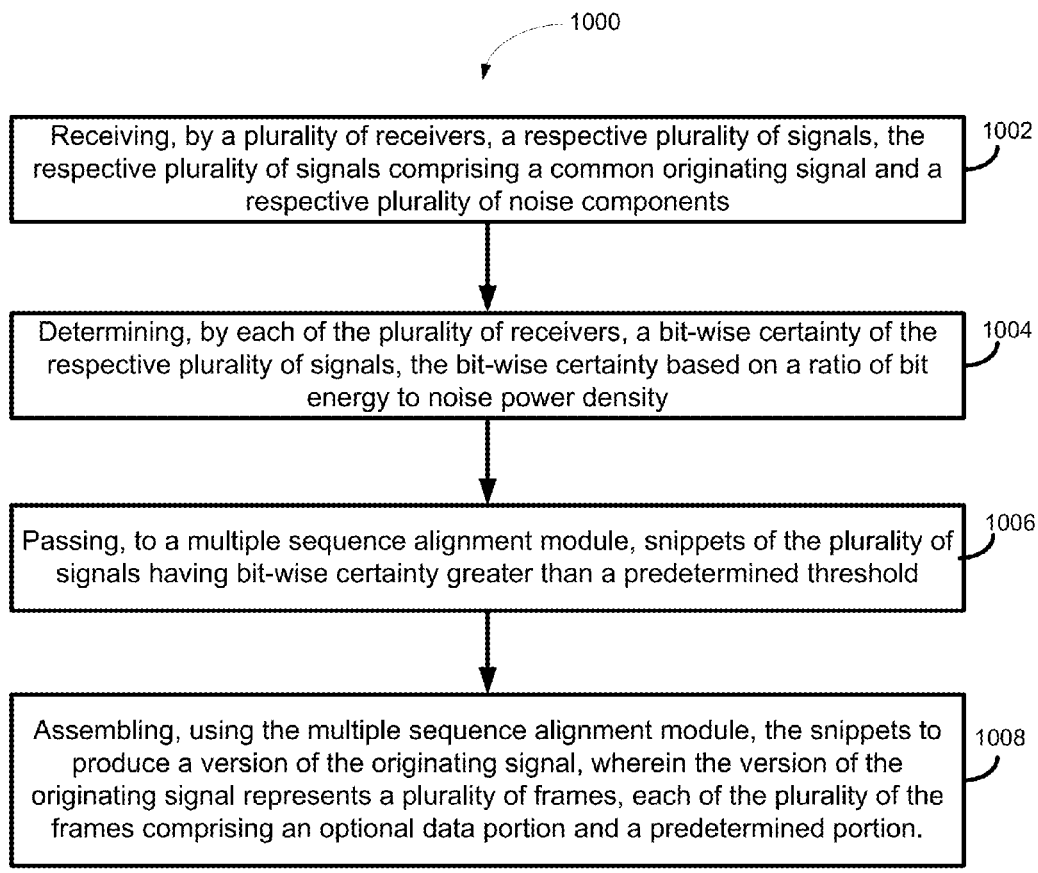
FIG. 10 is a flow diagram of a method 1000 according to an example implementation of the disclosed technology.

FIG. 10 is flow diagram of a method 1000, according to an example implementation of the disclosed technology. In block 1002, the method 800 includes receiving, by a plurality of receivers, a respective plurality of signals, the respective plurality of signals comprising a common originating signal and a respective plurality of noise components. In block 1004, the method 1000 includes determining, by each of the plurality of receivers, a bit-wise certainty of the respective plurality of signals, the bit-wise certainty based on a ratio of bit energy to noise power density. In block 1006, the method 1000 includes passing, to a multiple sequence alignment module, snippets of the plurality of signals having bit-wise certainty greater than a predetermined threshold. In block 1008, the method 1000 includes assembling, using the multiple sequence alignment module, the snippets to produce a version of the originating signal, wherein the version of the originating signal represents a plurality of frames, each of the plurality of the frames comprising an optional data portion and a predetermined portion.

Certain example implementations can further include sampling the version of the originating signal; buffering at least a portion of the sampled signal to produce a buffered digital sequence; processing, by a sequence alignment module, the buffered digital sequence using a known sequence, wherein the known sequence corresponds to the predetermined portion; determining, using the sequence alignment module, respective positions of the buffered digital sequence corresponding to the known sequence; comparing the known sequence with the buffered digital sequence at the respective determined positions; and outputting one or more parameters based at least in part on the comparing.

In certain example implementations, the assembling can include one or more of: progressive alignment construction; iteration; consensus, hidden Markov process, and simulated annealing.

In an example implementation, the predetermined portion initially matches the known sequence, and wherein the plurality of noise components introduces errors in the respective plurality of signals.

In an example implementation, the sequence alignment module may be configured to implement one or more of a Smith-Waterman process, a Needleman-Wunsch process, and a sequence alignment process.

The various systems and methods, as described herein, may utilize BER measurements for diagnostic purposes. For example, the BER system (such as the BER system 200 as shown in FIG. 2) may be utilized to provide a figure of merit for the satellite communications link. In certain example implementations, adjustments may be made, and the BER measurement may be performed iteratively to identify factors that may degrade the signal-to-noise ratio. Certain example implementations may perform the BER measurements in real-time. Other example implementations may buffer/save the sampled incoming data stream and perform the BER measurements off-line.

In certain example implementations, the data alignment process as described herein may be utilized to synchronize the receiver with an incoming data stream without an external trigger. In certain example implementations, the synchronizing may be performed in real-time, or near real time. In certain example implementations, the sequence alignment process, as described herein may be computationally intensive due to its quadratic-time complexity in sequence length. For example, to calculate a positional distance between a known sequence of length m and an incoming data stream of length n can be proportional to m*n in time. According to an example implementation of the disclosed technology, the length of the known sequence (known and encoded in the incoming data stream) may be limited, for example, to 32 bits (or less) to help reduce the computation time.

In accordance with an example implementation of the disclosed technology the alignment/synchronization process, as discussed herein may be implemented in hardware. For example, in one implementation, a field-programmable gate array (FPGA) may be utilized to implement the sequence alignment module. In another example implementation, a graphic processing unit (GPU) may be utilized to implement the sequence alignment module. In yet other example implementation, one or more multi-core processors may be utilized to implement the sequence alignment module.

In other example implementations, the synchronizing may be performed offline. For example, at least a portion of the received data stream may be stored in a memory, and may be processed asynchronously to determine a BER. Such an example implementation may help reduce the complexity of the receiver and/or the alignment and/or BER modules. In such an off-line implementation, BER measurements may be made iteratively after adjustments are made to the communications system and/or data protocol, for example, to aid in optimizing the system.

In accordance with an example implementation of the disclosed technology, the sequence alignment process may be modified, for example, to assign a score to a cell in a matrix based upon logic of the data being aligned. For example, if the maximum value that can be read in a next byte of information is 0x06, but a value of 0XFF is found, this may mean that the sequence is not aligned.

In certain example implementations, the sequence alignment process, as may be applied to determining probability distributions associated with received data.

Various implementations of the systems and methods herein may be embodied in non-transitory computer readable media for execution by a processor. An example implementation may be used in an application of a computing device, such as a portable computer, tablet PCs, Internet tablets, PDAs, ultra mobile PCs (UMPCs), etc.

In the preceding description, numerous specific details have been set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "various implementations," etc., indicate that the implementation(s)

of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method comprising:
receiving a signal, wherein the received signal represents a plurality of frames, each of the plurality of the frames comprising an optional data portion and a predetermined portion;
sampling the received signal;
buffering at least a portion of the sampled signal to produce a buffered digital sequence;
processing, by a sequence alignment module, the buffered digital sequence using a known sequence, wherein the known sequence corresponds to the predetermined portion;
determining, using the sequence alignment module, respective positions of the buffered digital sequence corresponding to the known sequence, wherein the determining the respective positions comprises scoring an alignment of the digital sequence with the known sequence based on predetermined parameters, and wherein scoring the alignment based on the predetermined parameters comprises increasing a score for each adjacent matching bit and decreasing a score for each mismatching bit, and wherein insertions and deletions are treated as mismatches;
comparing the known sequence with the buffered digital sequence at the respective determined positions; and
outputting one or more parameters based at least in part on the comparing.

2. The method of claim 1, wherein the one or more parameters comprise a bit error rate (BER).

3. The method of claim 2, wherein the BER is further based on a summation of mismatched bits divided by a total number of compared bits.

4. The method of claim 1, wherein the received signal is degraded by noise.

5. The method of claim 4, wherein the predetermined portion of the signal initially matches the known sequence, and wherein the noise operates to introduce errors in the signal.

6. The method of claim 1, wherein the comparing comprises a bit-wise comparison of the known sequence with the buffered digital sequence at the respective determined positions.

7. The method of claim 1, further comprising extracting data portions of the buffered digital sequence based on the determined respective positions.

8. The method of claim 7, further comprising decoding the extracted data portions.

9. The method of claim 1, wherein the sequence alignment module is configured to implement one or more of a Smith-Waterman process, a Needleman-Wunsch process, and a sequence alignment process.

10. A system comprising:
a receiver configured to:
receive a transmitted signal, the transmitted signal comprising a representation of a plurality of frames, each of the plurality of the frames comprising an optional data portion and a predetermined portion;
sample the received signal; and
buffer at least a portion of the sampled signal to produce a buffered digital sequence; and
a sequence alignment module configured to:
process the buffered digital sequence using a known sequence;
determine respective positions of the buffered digital sequence corresponding to the known sequence; wherein the respective positions are determined based on predetermined parameters for scoring an alignment of the digital sequence with the known sequence, and wherein the predetermined parameters cause an increase in a score for each adjacent matching bit and a decrease in the score for each mismatching bit, and wherein insertions and deletions are considered mismatches;
compare the known sequence with the buffered digital sequence at the respective determined positions; and
output one or more parameters based at least in part on the comparing the known sequence with the buffered digital sequence at the respective determined positions.

11. The system of claim 10, wherein the one or more parameters comprise a bit error rate (BER).

12. The system of claim 11, wherein the BER is further based on a summation of mismatched bits divided by a total number of compared bits.

13. The system of claim 10, wherein the transmitted signal is degraded by noise prior to reaching the receiver.

14. The system of claim 13, wherein the predetermined portion of the signal initially matches the known sequence, and wherein the noise operates to introduce errors into the signal.

15. The system of claim 10, wherein the sequence alignment module is further configured to perform a bit-wise comparison of the known sequence with the buffered digital sequence at the respective determined positions.

16. The system of claim 10, wherein the receiver is further configured to extract data portions of the buffered digital sequence based on the determined respective positions.

17. The system of claim 16, wherein the receiver is further configured to decode the extracted data portions.

18. The system of claim 10, wherein the sequence alignment module is configured to implement one or more of a Smith-Waterman process, a Needleman-Wunsch process, and a sequence alignment process.

19. A method comprising:
receiving, by a plurality of receivers, a respective plurality of signals, the respective plurality of signals comprising a common originating signal and a respective plurality of noise components;
determining, by each of the plurality of receivers, a bit-wise certainty of the respective plurality of signals, the bit-wise certainty based on a ratio of bit energy to noise power density;
passing, to a multiple sequence alignment module, snippets of the plurality of signals having bit-wise certainty greater than a predetermined threshold;
assembling, using the multiple sequence alignment module, the snippets to produce a version of the originating signal, wherein the version of the originating signal represents a plurality of frames, each of the plurality of the frames comprising an optional data portion and a predetermined portion;
scoring an alignment of the predetermined portion with a known sequence based on predetermined parameters, wherein the scoring comprises increasing a score for each adjacent matching bit and decreasing a score for each mismatching bit, and wherein insertions and deletions are treated as mismatches; and
outputting one or more parameters based at least in part on the scoring.

20. The method of claim 19, further comprising:
sampling the version of the originating signal;
buffering at least a portion of the sampled signal to produce a buffered digital sequence;
processing, by a sequence alignment module, the buffered digital sequence using the known sequence, wherein the known sequence corresponds to the predetermined portion;
determining, using the sequence alignment module, respective positions of the buffered digital sequence corresponding to the known sequence;
comparing the known sequence with the buffered digital sequence at the respective determined positions; and
outputting one or more parameters based at least in part on the comparing.

21. The method of claim 20, wherein the sequence alignment module is configured to implement one or more of a Smith-Waterman process, a Needleman-Wunsch process, and a sequence alignment process.

22. The method of claim 19, wherein the assembling comprises one or more of: progressive alignment construction; iteration; consensus, hidden Markov process, and simulated annealing.

* * * * *